March 15, 1955

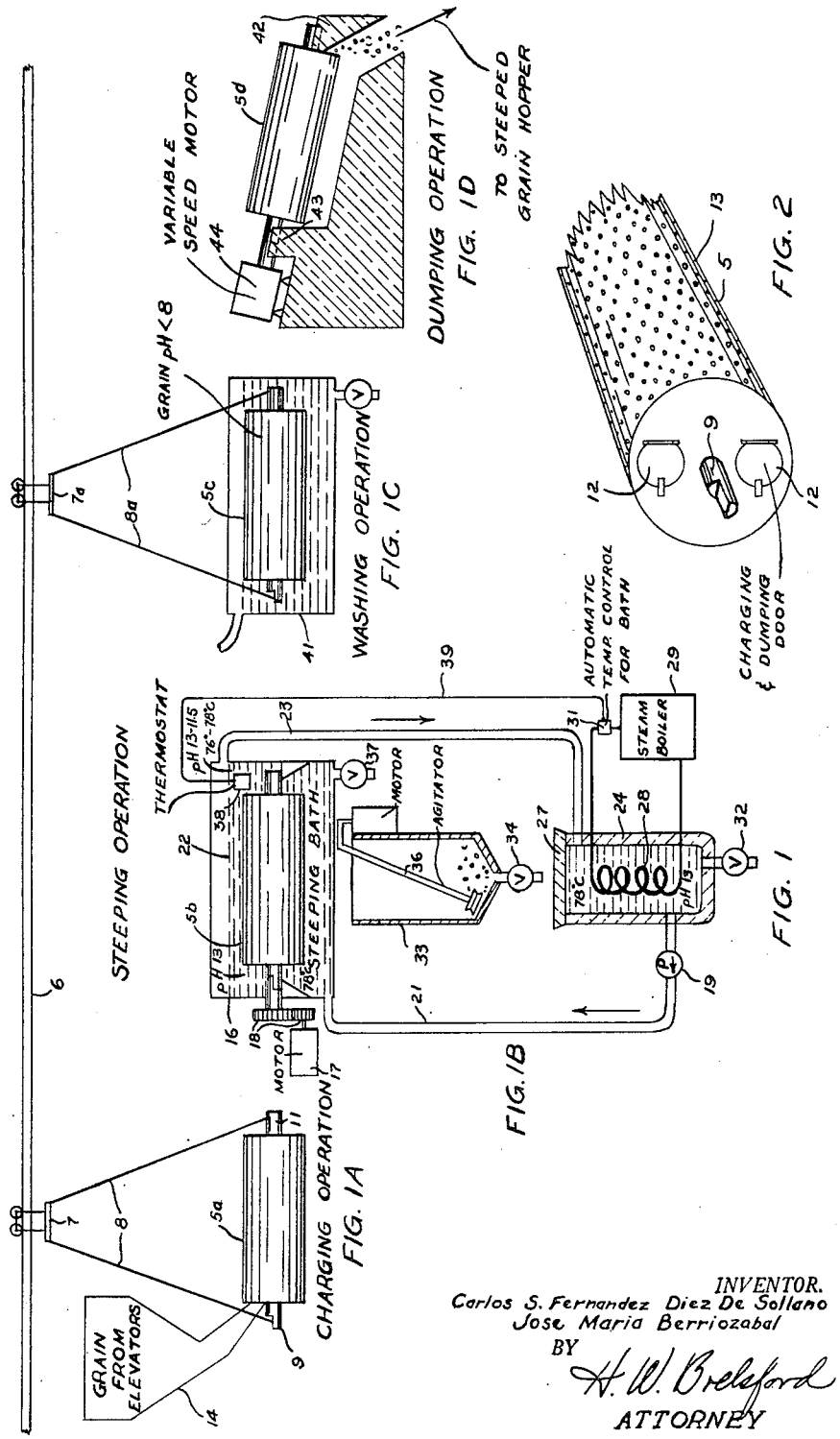

CARLOS S. F. DIEZ DE SOLLANO ET AL 2,704,257

METHOD OF PRODUCING CORN TORTILLA FLOUR

Original Filed Oct. 1, 1952

INVENTOR.
Carlos S. Fernandez Diez De Sollano
Jose Maria Berriozabal
BY
H. W. Brelsford
ATTORNEY

United States Patent Office 2,704,257
Patented Mar. 15, 1955

2,704,257

METHOD OF PRODUCING CORN TORTILLA FLOUR

Carlos S. F. Diez de Sollano and José Maria Berriozabal, Mexico City, Mexico, assignors to Process Millers, Inc., Las Vegas, Nev., a corporation of Nevada Original application October 1, 1952, Serial No. 312,632. Divided and this application May 28, 1954, Serial No. 433,114

Claims priority, application Mexico October 8, 1949

5 Claims. (Cl. 99—93)

This invention relates to the milling of whole corn grains and has particular reference to a process whereby a whole grain corn product, known as tortilla flour is obtained that will not turn rancid and will store perfectly over long periods of time.

This application is a division of our co-pending application Serial Number 312,632 filed October 1, 1952 and entitled Method of Milling Whole Grain Kernels and Product, which latter is a continuation-in-part of our co-pending application Serial Number 172,274 filed July 6, 1950 and entitled Method of Milling Whole Grain Kernels and Product.

The invention is based on the discovery of a novel method of milling whole corn grains wherein the natural enzymes of the corn that cause rancidity become deadened or destroyed, resulting in a dry, comminuted and sterile product that is nonrancidifying in character. Corn referred to herein is Indian maize as contrasted to wheat.

The word "enzymes" as used herein refers to the enzymes that cause rancidity including esterases such as lipase, lecithinase, etc.

The enzymes are the active agents causing rancidity and when these chemical substances are denatured or destroyed rancidity is avoided. While various treatments are known to destroy enzymes, the better known processes produce undesirable effects in the taste, nutrition and value of the flour. This invention leaves no undesirable characteristics. The nutrition of the natural oils and fats is retained as well as the vitamin content. Protein is largely unaffected, and the digestible content is actually increased. The flavor of the flour and its products is not only pleasing and highly acceptable but is an improvement over flour of any type heretofore available in commerce.

More particularly, the novel method of the invention comprises the steeping of the whole corn grains in an aqueous solution under controlled conditions of temperature and time of steeping, followed by the simultaneous comminution and dehydration of the steeped grains under controlled temperature conditions. The natural enzymes of the grains are debilitated in the steeping step of the method and are finally destroyed in the combined comminuting and dehydrating step while the comminuted resultant product is completely sterilized during the performance of the second step of the method. Simultaneous comminution and dehydration of the steeped corn grains may be effected by comminuting the steeped grains in a grinding mill, preferably of the hammer type, while simultaneously subjecting the steeped grains, as they are being comminuted, to the dehydrating action of heated gases. We have discovered that certain temperature conditions will effect sterilizing despite evaporative cooling effects. The two factors of enzyme control and sterilization coact with each other to produce whole corn grain ground products possessing long shelf life. The invention prevents enzyme action by deadening and destroying the natural enzymes of the grain by a combination of thermal, chemical, and mechanical actions, and prevents creation of enzymes by bacteria and fungi by sterilizing the ground product.

The fact that bacteria and molds can cause formation of the different enzymes is well established. Thus, even complete deadening of the natural enzymes will not prevent rancidity if bacteria and fungi are allowed to react or multiply. The present invention kills these growths by sterilizing the grain without adversely affecting the resultant product.

While various types of mills may be used in our milling process, we prefer at present to use rotary impact mills. We have tested tooth mills and find that they perform a grinding operation but that it is difficult to obtain a dried product from them. Ball mills under suitable conditions and with modifications for passing air therethrough could be used. However, from a commercial standpoint we prefer to employ impact mills having a self-grading or self-separating action.

Various means of wetting or steeping the corn may be employed. For example the grain may be hot soaked in water or various other aqueous liquids may be employed. We prefer, however, in making a finely textured product, such as flour, to use a partial hydrolization treatment for the cellulose by employing a strong alkali, preferably calcium hydroxide, although sodium hydroxide or potassium hydroxide could also be used. When the grain is steeped in an alkaline solution, the cellulose of the hull of the grain is partially converted to hemicellulose and other components of the hull are converted to saccharides.

The final comminuted product of our process may be a whole grain corn flour containing all of the ingredients of the original hydrolized grain kernel, including fats, oils, vitamins, protein and starch. Thus maximum nourishment from the grain is assured in our product. No rancidity develops in our flour, inasmuch as the enzymes which create rancidity are destroyed in the milling operation constituting the present invention. Also the flour is sterile; fungi and bacteria being killed during the milling operation. There is no possibility of the survival of insects or their eggs or larva during the milling operation. The flour has a good white color for grains that have a white core or body, such as white corn, but of course will be colored when made from grains which have a color throughout, such as yellow corn. The final product is very palatable and has good physical characteristics for flour from the particular type of grain used. The final product is not as fine as white bolted wheat flour but is fine enough for most types of baking. It can be readily enriched either before, after, or during the milling operation, to include extra vitamins, minerals, proteins, etc.

Whole kernel corn grains heretofore have been disintegrated in mills of various types, including impact mills. The hulls of corn are so tough, however, that the final product generally was not a flour, but instead a coarse product. We have discovered, however, that if the hulls are thoroughly softened and weakened, that they, as well as the body of the kernel, may be minutely disintegrated. Grain thus softened, however, has a very high water content, which may be as great as 50%, and this gives rise to a severe problem in obtaining a dry flour. We have discovered also that this moisture may be removed by the simultaneous comminution and dehydration set forth above. An integral part of our invention therefore includes the use of a very strong and rapidly acting dehydrating agent, so that the grain will be dried as the comminuting progresses. In the preferred form of our invention we use a steady blast of extremely hot air to bring about this dehydrating action. Thus by the time the grain is ground to the fineness of flour, it is very dry, with a moisture content of about 8%, for example.

The action of the process on the enzymes is the important action determining keeping qualities. The limits of various factors of the process are determined, however, by the effect of the process on the major components of grain, first, on the cellulose of the hulls, second, on starch content of the kernel, and third, on the protein of the kernel.

First, with regard to the action on the cellulose of the corn grains, the cellulose of the hulls is hydrolized by the water solutions of CaO or CaO and NaOH mixtures, provided pH is not less alkaline than 11.5 and temperature is not less than 68° C. for a suitable time. The time duration of the steeping depends upon the pH and temperature, lower pH generally requiring longer steeping times and higher pH generally requiring shorter steeping times. For 68° C. temperature about two hours is required. At 78° C. about one hour is required and at 82° C. about a half hour is ordinarily required.

The chemical effect of alkaline solutions on the cellulose is not definitely known but may be that of depolymerization. The cellulose breaks down into hemicellulose. Other components of the bran or hull are converted into mucilaginous dextrins and monosaccharides, improving the palatability, digestibility and appearance of the resulting whole grain flour. The subsequent drying does not affect these bran or hull derivatives. Inefficient or incomplete chemical steeping is the cause of poor grinding characteristics, with the flour having larger hull fragments and a higher fiber content, limiting its suitability for certain products, for example, tortillas.

Edible acids are preferred for neutralization of grain hydrolyzed by alkali. Washing and neutralization should be performed at lower temperatures than steeping because the water penetration and hence gelatinization progresses with time of exposure to water.

The chemical steeping of the corn so weakens the hulls that fine flour is produced. The cellulose is substantially weakened, permitting the hulls to be finely divided, in contrast to the tough flinty hulls of natural grains. The chemical attack, and to a lesser extent hot water, weakens the binding material between the cellulose fibers, weakening the bran or hull in this fashion also. When non-chemically steeped grain is employed the hull fragments are large, and being quite light in addition to being tough it is almost impossible to pulverize these to flour fineness. When the grain is chemically steeped, flour is readily obtainable of a fineness that 95% will pass an 80 mesh screen and 100% will pass a 50 mesh screen.

Second, with regard to the action on the starch content, gelatinization is the most important effect to be considered. The type of gelatinization referred to is the forming of a colloidal suspension or gel due to hydrolysis of starch. If the starch of flour is gelatinized, the dough obtained therefrom may have normal elasticity and plasticity, but is too sticky and glue-like for commercial operations and is unsuited for certain bakery products.

The steeping action gives, of course, a high water content to the grain, and after penetrating the hull the water begins penetration of the starch. The combination of moisture and temperature causes gelatinization and once the reversible phase is passed the flour will be permanently gelatinized despite subsequent drying. The higher the temperature, the greater the gelatinization and most grains are partially gelatinized by steeping in an aqueous bath of 82° C. if the steeping time is in excess of a half hour. Therefore, while high moisture and high temperatures increase the debilitating action on the enzymes, these factors are adverse to the flour because of gelatinization.

The drying action, which employs very high temperatures does not cause gelatinization because of the effects of evaporative cooling. The higher the water content, the greater is the cooling action. The quantity of hot air and quantity of steeped grain should be carefully regulated so that the final temperature of the dry flour will not exceed 73° C., such being below gelatinization because of the low water content of the finished flour. If too much air is used or if the air is too hot, the flour has a higher temperature, and at extreme temperatures caramelization and toasting takes place which is deleterious for baking purposes.

Third, regarding the proteins, there is a distinct difference in flours and meals having plain hot water steeping. The bases react chemically with the protein present to change the physical characteristics of the resulting dough. Alkaline steeped corn gives rise to a dough that is more elastic and plastic than dough from water steeped corn or improperly steeped grain. The exact chemical reactions are not definitely known, but undoubtedly various protein complexes are formed from the combined action of calcium or sodium, temperature, pH and water content. The hot alkaline solutions act first on the protein of the hull, and then on the protein of the embryo and the starch-gluten of the endosperm adjacent to the hull. The enzymes, which are proteins, are affected at the same time.

The effect of steeping temperature is not important on the proteins, and maximum steeping temperatures are determined by starch reactions. Conversely, maximum flour temperatures in the drying are determined by the protein and have little effect on the starch. If the final flour temperature is too high the amino acid compounds and the glutamic acid compounds are subjected to a denaturing. Low water content in the flour accompanied by overheating causes in the resulting dough a coagulation and practically a polymerization of the amino compounds. There results poor elasticity and plasticity in the dough. The combination of temperature and moisture in the final flour is important. Therefore, while enzyme control favors high flour temperatures, the denaturing action on the protein and the protein compounds limits the final flour temperature.

Our invention may be applied very effectively in the making of tortilla flour. One of the principal whole grain food products known to the world is the tortilla corn product made according to the ancient Indian procedures of Mexico, Southwest United States, Central and South America. While a dry flour is not formed in this Indian process, the whole corn kernel is used by means of a wet milling process. In the native Indian process the corn is placed in a pot of water, brought to the boiling point, and a pinch or two of quicklime (CaO) is added. This is allowed to set for several hours until the alkaline hydrolyzation action on the cellulose of the husk is sufficiently advanced for hand milling. The corn in this state is known as nixtamal. Thereafter the corn is removed from the pot and ground in a hand mill or metate, producing a pasty dough known as masa.

Throughout the Indian countries the masa is formed into flat cakes about 5 inches in diameter and about 1/8 inch thick, and these are baked on a hot stone or stove top, or other hot surface to form the well known tortillas. These tortillas form a major part of the cereal food consumed in a large number of countries.

The modern nixtamal business is well established, especially in urban centers, but is substantially the same. Corn is placed in vats to which quicklime has been added and it is stirred by means of wooden paddles. After steeping for several hours in the vat, the liquid is drained away and the corn ground in a rotary stone mill. Masa is produced directly from the stone mill and is sold directly to the consumer. However, since the masa is moist it keeps for only a few hours, especially in the hotter climates. The rapidity with which the masa spoils leads to many diseases and infections of the digestive tract, and accordingly presents a health problem throughout Mexico and other tortilla consuming countries.

Many attempts have been made to eliminate this health problem and to increase the useful life of masa. The most successful approach to the problem has been to develop a dry flour from nixtamal. One of the two principal lines of attack on the problem has been to dehydrate or dry the masa and convert it into a dry granulate or powder by one or more cycles in a dehydrating and powdering process. The products of such processing, however, have generally lacked elasticity and flavor. A second general attack on this problem has been the dehydrating of nixtamal corn kernels so that these kernels could be milled to a dry flour. This process has proved to be rather expensive.

We, the present inventors, have previously developed a third major attack on the problem which is a combination of the first and second processes outlined; that is, the nixtamal was dehydrated so that a substantial part of its water was removed, lowering the water content, for example, to 30% or below. This material was then milled, resulting in a very moist flour with a very short keeping time. However, by employing a drying process on the flour itself, the moisture could be reduced to a point where it had satisfactory keeping properties. This process, too, was expensive, especially as compared to our present invention.

Our present invention not only eliminates the use of the two principal approaches but renders them obsolete. Instead we can use the wet nixtamal and directly convert it to a dry flour in one single milling step. There is no intermediate step or product formed, such as masa, and instead, the wet nixtamal may be progressively comminuted and dehydrated to a dry flour in a single milling step. Thus our invention may be applied to an ancient industry to completely revolutionize it and to produce a new product that can be stored for many months.

We have found that the preliminary steeping operations, especially the hydrolyzation of the cellulose of the hulls of corn must be carried out quite precisely in order to obtain a commercial product of highest quality. Accordingly we have devised a continuous process for effecting this steeping or hydrolyzing action which employs mechanical agitation of the grain in the steeping bath, circulation of the liquid, the maintenance of a relatively constant pH in the solution, and a relatively constant temperature. In our present process the drums are perforated so that liquid may freely flow through them, the drums are rotated while immersed in the steeping bath so that all kernels of grain are thoroughly exposed to the liquid. The drums are then bodily picked up, removed to a washing bath and thereafter the drums are emptied to deliver the grain to the impact or other mill employed in the comminuting operation.

It is a general object of the invention to produce whole corn comminuted flours that keep for long periods of time and that are non-rancidifying.

Another object is to provide a sterile corn tortilla flour from whole corn grain which will not become rancid and will have good keeping qualities.

Still another object is to provide a milling process for whole grain corn flours wherein the natural enzymes are deadened and in addition bacteria and fungi are destroyed to form a sterile product.

Another object is to provide a new and novel process for making whole corn grain flour suitable for tortillas and other products.

Other objects and advantages of our invention will be apparent in the following description and claims considered together with the accompanying drawings, in which:

Fig. 1 is a schematic illustration of our presently preferred grain steeping or hydrolyzing step which forms an integral part of our milling process and wherein, Fig. 1A illustrates the charging operation,
Fig. 1B illustrates the steeping operation and apparatus,
Fig. 1C illustrates the washing operation, and
Fig. 1D illustrates the dumping operation and apparatus.

Fig. 2 is a simplified perspective view of a perforated drum employable in our apparatus and showing the charging and dumping doors.

*Steeping step*

Figure 3:
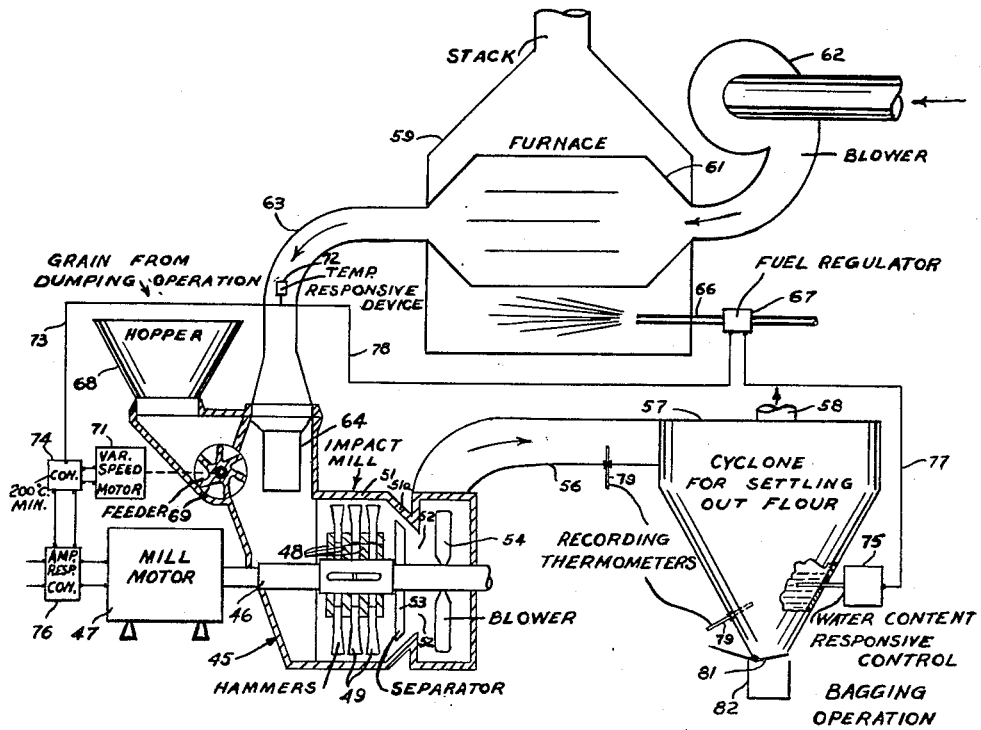
Fig. 3 is a schematic view of the comminuting and dehydrating apparatus which may be employed with our invention and which receives the grain from the dumping operation of Fig. 1.

Any suitable apparatus may be employed in carrying out the present invention, and the drawings illustrate one form of apparatus which may be utilized.

Referring to Fig. 1 there is illustrated the general process for steeping corn in accordance with our invention wherein a series of rotatable drums 5 may be carried from one step to another by means of a rail 6 upon which is disposed a hoist 7. Cables 8 may lead from the hoist 7 to opposite ends of the drums 5 to engage shafts 9 and 11, respectively, projecting from each drum. Each drum 5 may have doors on their ends as illustrated in Fig. 2 at 12. The ends of the drums may otherwise be solid but the cylindrical surface thereof may be perforated with a series of fine perforations 13 which admit liquid but are small enough to prevent the egress of grain. If desired a lining of wire screen may be disposed inside of sheet metal drums having relatively large perforations. The projecting shaft 9 is shown as a split shaft for illustrative purposes only to indicate that a driving connection therewith is possible for rotating the drum 5. It will be appreciated, however, that more suitable mechanical connectors will be employed.

Referring to Fig. 1A corn may be introduced into one end of the drum 5a from an elevator 14 and when this drum is approximately half full of grain it is bodily lifted by the hoist 7 to be deposited within a tank 16, illustrated in Fig. 1B. A driving connection is made between its shaft and a motor 17 which may drive the drum through a pair of gears 18. The shafts of the drum may rest on suitable bearings.

The apparatus of Fig. 1B includes a continuous circulation of steeping liquid by means of a pump 19 driving fluid into an inlet pipe 21 which in turn fills the tank 16 with a steeping bath 22, the level of which is maintained by an overflow pipe 23 which leads to a heat exchanger tank 24. This tank is preferably insulated and has a removable insulated lid 27. The liquid within the tank 24 may be heated by means of steam coils 28 energized by a steam boiler 29 with the flow of steam regulated by a control valve 31. The tank may be provided with a valved outlet 32 for completely emptying the tank or heat exchanger 24.

For grinding corn, especially for making tortilla flour, we prefer to steep the corn in a calcium hydroxide alkaline solution. This solution may be initially prepared in a tank 33 disposed directly above the heat exchanger 24. It may have a valved outlet 34 and a mechanical agitator 36 may be provided. To form the alkaline solution, a quantity of quicklime (CaO) is introduced together with water into the tank 33 and mechanically agitated. If the quicklime is of high quality and fresh, a pH as high as 14 may be obtained, but more conventionally a pH of 13 is attained as maximum alkalinity with quicklime. An excess of CaO is provided, which settles to the bottom of the tank 33.

The entire steeping solution is preferably renewed once for every ten or twelve batches of grain treated therein, and this is effected by first removing all of the liquid present in the system. Repeated use of the steeping liquid increases the surface tension, decreasing the water content of the steeped grain. The heat exchanger valve 32 is opened as well as a valve 37 on the bottom of the tank 16. When the entire system is emptied, the valves are closed, the lid 27 is removed, and the valve 34 opened in the bottom of the refresher tank 33. The alkaline solution from within the tank 33 together with the excess of calcium oxide is then passed into the heat exchanger 24 and the pump 19 in turn fills the tank 16. The lid 27 may be replaced at the end of the filling step and the steam coils 28 energized to heat the liquid in the entire system. The liquid may be kept accurately under control by means of a thermostat 38 disposed near the outlet of the tank 16 and this in turn controls automatically the valve 31 on the steam coils through an electrical conductor 39. An excess of calcium oxide at the bottom of the heat exchanger maintains the pH in the system constantly at 13.

We have found that for corn a temperature of 78° C. may be used with the pH 13 to obtain rather complete nixtamalization of corn, in a period from one to one and a third hours depending upon the type of corn. In this nixtamalization process part of the cellulose of the hull is converted to hemicellulose, and the binding material for the cellulose fibers is weakened. Not only does this conversion weaken the hull of the corn and condition it for a milling operation, but it also improves the alimentary value of the corn by rendering it more digestible. Additionally, the steeping of the grain in the bath renders it soft so that the hulls of the grain may more easily be broken in the comminuting step. Further, the corn swells so that it nearly fills the drums if the drums were half full of dry corn before nixtamalization.

In some cases a washing operation may be desirable after the steeping is completed in the tank 16 of Fig. 1B. A hoist 7a may hoist the drum 5 therefrom and deposit it in a washing tank 41, illustrated in Fig. 1C. While the drums could be rotated while in this bath it is found that the hulls are sometimes chipped or rubbed if the drum is rotated, and hence a mere dipping type of washing is preferred at present unless removal of the hull is desired. The washing is continued, preferably with warm water, until the surface of the grain reaches a desired pH. Washing is generally undesirable for tortilla flour.

When the washing operation of Fig. 1C is completed the drum is hoisted from the tank 41 and deposited upon bearing supports 42 and 43 so that the drum 5d assumes an inclined position as illustrated. We have found an angle of incline of about 12° is satisfactory. The doors 12 on the right-hand end of the drum 5d are then opened and the drum is rotated slowly by means of a variable speed motor 44. As the drum is emptied, the speed of rotation may be increased by a manual control for the motor 44. The grain accordingly tumbles from the lower end of the drum 5d to a hopper for steeped grain, illustrated in Fig. 3.

While we have described preferred temperatures and alkalinities for our steeping bath of Fig. 1B, as related to the steeping or nixtamalization of corn, it will be appreciated by those skilled in the art that various temperatures and alkalinities may be employed. For example, if a quicker hydrolyzing action is desired for grain, either sodium hydroxide or potassium hydroxide or mixtures with calcium hydroxide could be employed as a bath, in which case a pH of 14 is commercially practical. These higher pH's may be very desirable from the standpoint of obtaining a rapid partial hydrolyzation of the cellulose and weakening of the hull. In a rapid hydrolyzation the grain kernel as a whole will pick up less water, requiring less heat to dry the grain during comminuting as will be described with reference to Figs. 3 and 4. If sodium hydroxide or potassium hydroxide is used, phosphoric acid may be also added as soon as the steeping step is finished. For example, the phosphoric acid may be added to the washing bath and will form phosphate salts in the grain kernels as it reacts with the hydroxide, so that the final product will have the highly desirable phosphates therein.

We have found with respect to corn grains that pH 11.5 is a minimum. If the alkalinity drops below this value the cellulose will not be hydrolyzed regardless of the duration of the steeping operation. If corn is steeped in a bath of deficient alkalinity and is subsequently comminuted, especially in accordance with our process, the hull will flake off of the body portions to which it is attached. Since the hull is of very small mass and of extreme toughness, it will not be comminuted. Instead, it will pass through centrifugal and gravimetric separators as large flakes together with the finely divided body material, giving a coarse quality of flour or meal. The maintenance of a pH of 11.5 or higher is therefore essential and in our process we obtain excellent control of pH as described.

The hydrolyzation of the cellulose of the hull of the corn need be only partial. While a quantitative definition of the words "partial hydrolyzation" is difficult, in the case of nixtamal the steeping is deemed to be sufficient when the corn meets an empirical manual balling test. When the steeping has progressed for enough, the hull can be manually removed from the body of the corn but is so lacking in tensile strength that it can be easily wadded up into a gummy ball and rolled between the fingers. If the hull comes off and will not ball together into a mass but retains its original shape of a film or glove over the body of the corn, then the hydrolyzation is incomplete.

The properly steeped hulls are sticky because of the presence of gluten therein and are weakened because part of the cellulose has been converted to hemicellulose and the binding material for the cellulose fibers has been weakened.

The term "partial hydrolyzation" may also be defined in terms of the reduction in crude fiber analysis of raw corn compared to nixtamalized corn. Thus in a typical corn used for making tortillas and which has been properly nixtamalized, the crude fiber content of the raw corn may be 2.8%, whereas that of the cooked tortillas may be 2.3%, both percentages being on a dry basis. This reduction of .5% in 2.8% amounts to about 19%. Thus for general purposes the stopping point of nixtamalization may be stated to occur when approximately one-fifth (⅕) of the crude fiber of the corn kernel has been converted to digestible hemicellulose and monosaccharides. In this connection it should be noted that part of the hemicellulose may show a test reaction as crude fiber.

Properly nixtamalized corn has a water content which varies according to the thickness of the corn. For thin or dent corn the water content may be as high as 50% with 45% and 46% being most common. For the larger thicker types of corn kernels the water content may be 40% or less. These percentages are proportions of total weight. These high water contents therefore give rise to the problem of dry milling of nixtamal.

The nixtamalization of corn improves the corn from a nutritional standpoint because the calcium of the alkali reacts with the amino acids of the hull to form calcium components, such as calcium glutamate which is readily digestible and is an excellent means of introducing calcium into the human digestive system.

The use of calcium hydroxide, potassium hydroxide, sodium hydroxide and strong alkalies helps to convert the indigestible cellulose to a more digestible form and lowers the total amount of crude fiber. The mineral content may be increased with desirable salts like phosphates by adding acids to the water of the washing operation as previously described. Thus all grains may have their nutritional values increased.

Proper nixtamalization will not affect the fats and oils and the associated vitamins. If, however, the corn is overnixtamalized, the calcium hydroxide will saponify part of the fat, rendering it indigestible. Overnixtamalization does not seem to affect adversely other proteins present but the starch material is partially converted into dextrins making the dough sticky so that it is unsatisfactory for tortillas.

As heretofore pointed out the enzymes are debilitated or weakened during the steeping step of the invention and the destruction thereof is completed during the second step of simultaneous comminution and dehydration of the steeped grain.

*Comminuting, dehydrating step*

Illustrated in Fig. 3 is a schematic diagram of the comminuting and dehydrating apparatus which we presently prefer in practicing our invention. While various types of mills can be used we have found that an impact mill is eminently satisfactory for effecting a progressive comminution of the steeped grain kernels. These impact mills are old and well known in the art and are available in various types, sizes and constructions. We prefer, however, at present to employ impact mills having an integral separator therein to classify the outlet materials according to mass. These impact mills generally have a series of plates mounted on a rotatable shaft and hammers are pivoted thereto near the periphery of the plates. These hammers revolve within the mill chamber but are spaced from the walls thereof by a distance of an inch to about ¼ of an inch depending upon the size of the mill. These impact mills effect comminution by striking the particles as they are borne on the turbulent air inside of the mill, breaking them by the blow, dashing them against the cylindrical mill chamber which results in further breaking, and the mill chamber in turn causes them to bounce back into the path of additional hammers.

In the drawing the impact mill may be referred to generally by the numeral 45 and may include a shaft 46 rotated by a mill motor 47 which may be of any type but is preferably an electric motor of constant speed. Mounted on the shaft may be a series of spaced plates 48 having hammers 49 pivoted near their peripheries. These hammers may be of a general elongated construction but will generally assume radial positions during rotation of the shaft 46. The mill may have a cylindrical body member 51 which is tapered as at 51a to form an outlet 52. Mounted on the shaft 46 opposite the tapered portion 51a may be a series of radial blades 53 which act as centrifugal separators. Heavy or dense material is centrifugally thrown outwardly to the tapered portions of the housing where it is directed into the region of the hammers 49 for further pulverization. A blower 54 may be mounted on the shaft 46 to direct the output of the mill through a conduit 56 to a cyclone 57 wherein the fine flour may be separated or settled out from the air, the clear air exiting through a stack or pipe 58.

As mentioned previously hot air is fed into the impact mill 45 and this hot air may be obtained from a suitable furnace 59 having a closed heater conduit 61 therein for the reception of atmospheric air forced into the conduit by a constant speed blower 62. Directly heated gases may also be used, such as the products of combustion of gaseous or vaporous fuels. After heating in the furnace 59 the air is passed through a conduit 63 to a nozzle 64 disposed in the upper end of the housing of the impact mill. There may be used in the furnace any suitable fuel which is subject to regulation, such as gaseous, liquid or powdered fuel and this may be introduced through a conduit 66 with the flow therein governed by a fuel regulator 67.

The steeped grain from the steeping step of Fig. 1 may be delivered from the dumping operation of Fig. 1D to a hopper 68 and the grain from the hopper may be fed at a metered, regulated rate to the impact mill by means of a rotary feeder 69. This feeder may be driven by a variable speed motor 71 that is preferably electric. A belt feed may be substituted for the rotary feeder 69.

It will be apparent that if grain is fed to the impact mill without the hot air being blasted therethrough, that the grain will be comminuted while in a mushy state, and will be deposited over the interior of the mill, clogging the mill and stopping the motor. Accordingly, a temperature responsive device 72 is provided in the conduit 63 from the furnace. This is connected by means of a conductor 73 to a control switch mechanism 74 for the variable speed motor 71 for the feeder. This mechanism 74 is so constructed that it will not energize the motor 71 until the air in the conduit 63 attains a temperature of 200° C. This accordingly prevents the feeder 69 from supplying steeped grain to the mill until an adequate temperature is attained in the air being blasted through the impact mill.

Furthermore, we desire to regulate the speed of the feeder 69 as a function of output of the mill motor 47 so that the maximum output of the mill will be obtained. The maximum mill output can only be obtained when the mill motor is generating maximum power and this in turn may be reflected by the amperage of the electric current consumed by the mill motor. For this reason we provide an amperage responsive control device 76 through which the current for the mill motor passes. This device reflects the amperage of the mill motor to the control 74 so that the variable speed feeder motor will be increased in speed at all times when the mill motor is not operating at maximum power output. In this way the mill is operated at maximum capacity automatically in response to the current consumption of the mill motor, assuming that at all times the furnace is delivering hot air having a temperature of at least 200° C.

Inasmuch as the quality of the product is the major objective in the entire milling process, the primary and overriding control is based upon the quality of the flour produced. This quality may be measured in terms of percentage of water content of the finished flour inasmuch as we have discovered that the keeping quality of corn flour and meal is almost directly related to the water content, other factors remaining constant. If the air is not hot enough while passing through the impact mill, the water content of the flour will be excessive. If the air is too hot there will be too little water content. Accordingly we provide a control device 75 that is responsive directly to the water content of the finished flour. For this reason the device is placed toward the bottom of the cyclone 57 so that it may immediately sample the flour as it is delivered fresh from the impact mill. The control device 75 is connected directly by a conductor 77 to the fuel regulator 67 and reduces fuel when the water content is low and increases the fuel when the content is high. Therefore the water content of the flour directly controls the heat of the furnace and overrides any impulse or signal that may be delivered from the feeder control apparatus.

To complete the description of the automatic grain feed and fuel control it should be noted that a conductor 78 leads from the temperature responsive device 72 in the furnace outlet to the fuel regulator 67, completing a path from the motor control 74 to the fuel control 67. The feed control device 74 which governs the variable speed motor 71 also generates an electrical impulse to open or close the fuel regulator 67 in accordance with an increased or decreased grain demand signal from the amperage control 76. In actual practice the entire mill of Fig. 3 reaches a steady state condition in approximately half an hour after it is started. Recording thermometers 79 may be provided in the outlet conduit 58 and the cyclone 57 to indicate the temperatures of the outlet air and the flour respectively.

The automatically controlled system described also automatically compensates for changes in humidity of the atmospheric air being heated and it compensates for changes in the water content of the corn being received by the impact mill. This is because both of these factors affect the water content of the finished product and hence this is immediately reflected to the fuel regulator 67. The control from the amperage responsive device 72 and the water content device 75 are independent, but work together.

While various types of controls for the volume of the air could be devised, we prefer at present to maintain the volume of drying air constant, and obtain drying regulation by varying the temperature, as previously described. Accordingly the independent blower 62 and the mill blower 54 are selected to have the desired capacity, and they preferably deliver the same output. The blower 62 insures that the air in the furnace will be under a positive pressure. The upper limit of the flow of air through the mill will be determined primarily by the capacity of the separator and the mill, and the lower limit will be that necessary to prevent clogging of the mill, assuming, of course, that the air is heated in both instances. The specifications of the manufacturer of the mill will often be of assistance as a general guide on air flow or volume in employing the mill in our process.

In our process we employ air blasts of extremely high temperature but because of the cooling effect of rapid evaporation, the temperature of the flour is relatively low. As set forth heretofore, a final temperature of 73° C. should not be exceeded, for best results and quality of product. We do not have to regulate the air temperature with respect to the temperature of the flour inasmuch as we find that regulation with respect to the water content of the flour sufficiently regulates its temperature also. For example, when the water content control 75 is set for water contents of 10% to 5%, the corn flour temperatures are never excessive and generally remain about 65° C.

The finished flour may be packaged directly from the cyclone 57 or may be cooled and then packaged to prevent air from entering the package upon cooling. This bagging operation is illustrated diagrammatically in Fig. 3 wherein a damper type of shutoff mechanism 81 controls the flow of flour to a receptacle 82. While cloth or paper bags can be used for bagging or packaging our product, we prefer at present to employ a bag of waterproof plastic material inasmuch as this preserves the flour in extreme humidities encountered in tropical lowlands.

Figure 4:
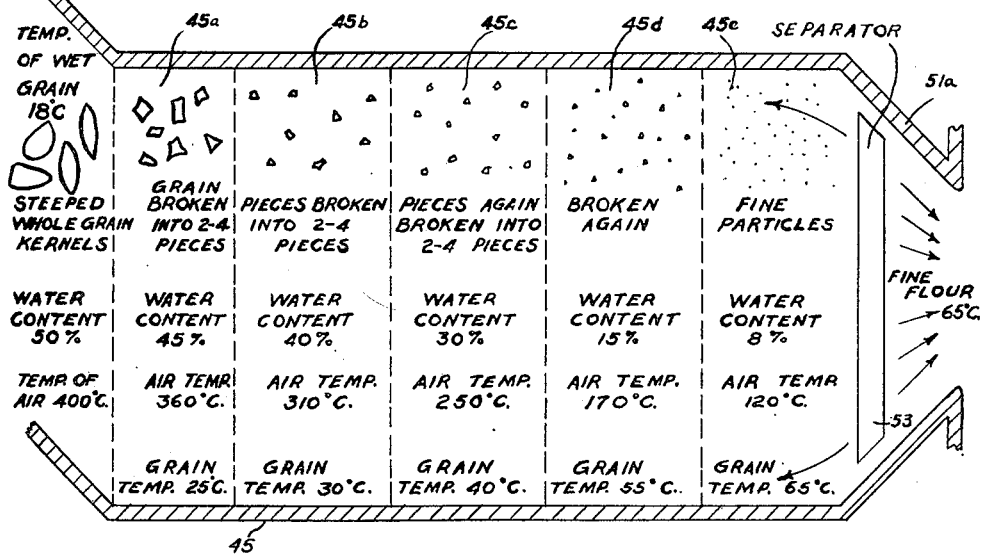
Fig. 4 is a diagram with a description of the processes of comminution and dehydration that take place within the impact mill of Fig. 3.

Illustrated in Fig. 4 is a diagrammatic representation of our simultaneous comminuting and dehydrating step which occurs within the confines of the impact mill 45 of Fig. 3. For purposes of illustration, the representative mill casing is divided into vertical sections with appropriate descriptive matter applicable to the sections. We have illustrated an air temperature of 400° C. which is a very satisfactory temperature in actual operation. There is no theoretical upper limit to the temperature of the air that we have discovered but from the commercial standpoint of heating the air we have found that 900° to 1200° C. is a commercial upper limit of temperature for heating apparatus commercially available. Temperatures in excess of 300° C. and up to 900° C. permit milling of grain at the maximum rated output of an impact mill, the temperature depending upon the amount of water present in the grain. The lower limit of temperature is fixed by the air temperature necessary for sterilization of the grain during the milling operation and this we have found to be approximately 180° C. However, it is difficult to operate a mill at near capacity with air of this temperature.

The water content of the grain kernels is illustrated as 50% water content which is a high water content compared to some types of corn. Dent corn may have water content of 45% to 50% and the common larger variety of corn may have water contents of about 40% or less. As mentioned previously this water content must be reduced to 10% or less to obtain flour with good keeping qualities. The temperature of the grain from the steeping operation is shown as 18° C. which occurs upon cold washing or neutralizing and during the milling operation the grain may be gradually heated to 65° C.

Shown in the first division 45a within the mill body 45 of Fig. 4 is the breaking of the grain kernels into large fragments. It is during this initial part of the comminuting operation that sterilization takes place inasmuch as the air is hottest at this region. While the body or interior of the various fragments or pieces is very slightly heated by the hot air, the outermost layer of each particle is heated to a very high temperature as soon as the surface moisture is evaporated. If this temperature is in excess of 180° C. all the fungi and bacteria will be killed instantly and the enzymes are apparently destroyed or at least neutralized. If bacteria or fungi are present in cracks within the grain, the grain will invariably break along these cracks, exposing these surfaces to the full temperature of the hot air blast. This surface heating during this initial stage 45a is only on the very extreme surface and probably does not penetrate more than one thousandth of an inch.

While all details are not known, this sterilizing action is apparently aided by a natural glazing effect wherein the heat forms a glaze or crust on the exterior of the grain. This glaze seals the interior moisture of the grain so that it is not effective for evaporative cooling. This permits the exterior of the grain to be heated to very high temperatures and the sterilizing action seems to be substantially independent of the water content.

The exposure of the very wet and soaked kernels to the hot blast immediately dries the surface of the particles preventing any sticking or gumming of these particles regardless of the amount of water immediately below the surface. Therefore in spite of the relatively high water content in the first stage which may be as great as 45%, the particles react to the impact mill in much the same fashion as dry materials being broken in an impact mill. No collections of wet materials are possible which is important inasmuch as a small amount of accumulation of soggy or wet material would not only reduce the efficiency of the mill but could slow it down and stop the motor entirely.

The grain kernels are broken into particles by the rapidly whirling hammers of the impact mill and the hot air blasted through the mill immediately dries any fresh surfaces formed by the progressive comminution. The hammers also beat to pieces the germ of the kernel, spewing its fats and oils on nearby particles, dispersing this oil over particles from all parts of the kernel. The oil is thus subjected to the heat at its maximum effectiveness since the outermost film of a particle is least affected by evaporative cooling. While enzymes withstand high temperatures in a body of oil, they are rendered inactive at lower temperatures when present only in a film of oil. The effect of the mechanical smashing of the germs and dispersion of fats and oils together with the heat of drying is to render the enzymes still more inactive, and apparently deadening or destroying them.

The enzymes of the steeped grain delivered to the mill are weakened or debilitated due to the conditioning of the steeping. This preparatory weakening makes possible the positive deadening of the enzymes in the simultaneous comminuting and dehydrating step.

We have further discovered that the enzymes that cause rancidity may be kept in their deadened or immobilized condition, or the destroyed enzymes may be prevented from reactivating, by placing the flour in a dehydrated condition. The dehydrating action accompanying the comminution should be so regulated that the final comminuted product has a water content not greater than about 10% and preferably between 5% and 8%. If a water content of 14% or 15% is used the lipase enzymes can reform or regroup within a few months, whereas products of 5% water content can store for a year or more without turning rancid.

The progress of the comminution is clearly illustrated in Fig. 4 wherein the particles become progressively smaller as they pass through sections 45b, 45c, 45d, and 45e. The water is evaporated off of the surface of the particles and the smaller the particles become the greater is the total exposed surface. Therefore the evaporation of the water is greatest in sections 45c and 45d and the drop in air temperature is greatest here also because of this absorption of water by the air. As the grain particles become smaller they are heated up faster and accordingly the greatest increase in temperature of the grain particles occurs in these sections also. While the turbulence of the air within the mill is very great, there is a general flow from inlet to outlet that carries the materials along so that comminution from one size takes place in different regions of the mill.

In the last section 45e the particles must pass through the centrifugal separator 53. If any of these are of large size or high mass they will be thrown outwardly where they will strike the inclined surface 51a to be returned to the region of the hammers for further comminution, as illustrated by the arrows leading toward the left. The fine material having the proper size will be carried through the centrifugal separator by the blast of air passing through the mill and will be carried through the blower 54 (Fig. 3) to the cyclone for settling.

The foregoing general description of the comminuting and dehydrating step is of general applicability. The size of the impact mill employed is not critical and we have found that the peripheral velocity of the hammers may be used as the governing factor in the mill operation or selection. We find that the most satisfactory peripheral speed for corn is between 3500 and 5,000 meters per minute which, of course, is the product of the circumference of the rotative parts of the mill and the revolutions per minute.

The time of cycling of the wet nixtamal to convert it into dry flour is on the order of 30 seconds with perhaps 5 to 10 seconds of this time being the duration of the comminuting and dehydrating step. In this connection we have obtained from a mill about 2½ feet in diameter a yield of about 30 tons of fine flour in an 8 hour period, with a power consumption of about 80 H. P.

The temperatures given in connection with Fig. 4 are also typical corn milling temperatures. Thus the inlet air may be 400° C. or 450° C. and the outlet air from the mill may be about 120° C. and about 80° C. from the cyclone. The inlet temperature range may be from 200° C. to 450° C. for commercial results. The quantity of the air per minute may remain constant as described previously. In this connection we have employed, as a typical example, 1600 cubic meters of air heated to 250° C. in making 100 kilograms of flour when the original nixtamal had a water content of about 45%, for operations carried on at an altitude of 7,500 feet.

The temperature of the corn flour is preferably in the range of 65° C. and 73° C. and should not exceed these values. If corn flour is heated much above these values, the action of the gluten is impaired and dough from such flour lacks elasticity and plasticity. This deficiency in flour is often encountered in corn flours made from dehydrated masa wherein high temperatures are employed.

We have found out in testing prior processes that water contents for corn flour of about 15% are excessive, causing spoilage of the flour after a few months. We have found that for long keeping qualities, that is about a year, the finished corn flour should have a water content of 10% or less by weight. In actual practice we prefer to have corn flours in the range from 6% to 8% water content.

*Example*

The following example of making tortilla flour was performed in Mexico City, the elevation being approximately 7500 feet above sea level.

Corn may be alkali steeped to produce corn flour of outstanding quality which is suitable for many uses including the making of tortillas. Cleaned whole grain corn may be placed in an aqueous bath made alkaline by CaO until pH 13 is reached. Steeping at 78° C. should be continued for one hour. This will weaken and chemically denature the enzymes sufficiently, as well as attack the cellulose. An empirical test for cellulose weakening is when the hull may be slipped off of the kernel and wadded up into a homogeneous ball that cannot later resume its shape or form as a hull. The alkali steeped grain may be comminuted in an impact mill at 450° C. until water content is between 6% and 8% and final flour temperature is between 68° C. and 73° C. The flour will keep for a year or longer without turning rancid.

*Variables and limits*

Numerous additional examples and tests, also performed at Mexico City, have determined the following variables and limits of the invention.

The lowest practicable steeping temperature for effecting the enzyme debilitation of this invention is 68° C., but it is preferable to exceed this temperature. For obtaining products which are not gelatinized the highest practicable temperature appears to be 82° C. For products where some degree of gelatinization is desired, 82° C. may be exceeded. However, temperatures above 90° C. are considered cooking temperatures as compared to steeping temperatures. The enzyme debilitation takes place in about two hours at 68° C. and with the steeping solution at 82° C. and above, the enzyme debilitation takes place in about half an hour. At 72° C. the steeping time is about one and two-thirds hours and at 78° C. the steeping time is about one hour. Steeping from 68° C. to 82° C. for two hours to one-half hour respectively does not result in gelatinization for the corn. Times in excess of these will generally result in gelatinization.

The enzymes debilitated, as mentioned previously, are the enzymes that cause rancidity such as the lipases and the lecithinases. Other enzymes present in grain are responsive to different temperatures, but the rancidifying enzymes become substantially weakened or debilitated in the presence of moisture at 68° C. or higher for the times specified.

Hydrolyzation of the hulls for producing fine flour may be accomplished, at appropriate pH, substantially within the foregoing time and temperature ranges or combinations for enzyme debilitation. This is done with an alkaline solution to assist the enzymes debilitation by reaction of enzymes with the metals of the alkali, especially calcium and by creating a pH adverse to the enzymes. The lowest practicable pH is 11.5 obtainable with ordinary CaO water solutions and pH 14 seems to be the highest that is commercially obtainable. This highest pH may be obtained with CaO and NaOH water solutions in the temperature ranges mentioned in the foregoing paragraph.

Intermittent mechanical agitation simultaneously with circulation of the bath is required in practice for commercially uniform results.

In addition to steeping control in terms of time and temperature a microscopic examination of the steeped hull may be employed to determine sufficiency of the chemical steeping. The most practical is to rub off the outer part of the bran, leaving the aleurone layer on the endosperm. Upon microscopic examination, the aleurone layer should be intact, and should be smooth, complete and adhered to the endosperm. If it is loose or rough, then the steeping has progressed too far. For dehulled grain products, the aleurone layer will be disintegrated.

The simultaneous comminution and dehydration with gases initially not less than the critical minimum temperature of about 180° C. results in sterilization of the product. It is preferable that the dehydrating gases and the steeped grain be fed to the mill in the same conduit so that the whole kernels will receive at least momentary exposure to the hot gases to achieve the sterilizing temperature. There seems to be no upper limit of gas temperature within the practical range of heating, and temperatures for heated air of 900° C. have been satisfactorily employed. Undoubtedly gas at 1200° C. would be satisfactory. Evaporative cooling prevents heating of the grain particles above the critical product temperature, provided the grain feed is adjusted to the air temperature and volume and vice versa. The grain is preferably comminuted while still hot from the steeping, to maintain temperatures that are adverse to the enzymes.

The upper limit of grain product temperature during dehydration is 73° C. because of the denaturing of the amino acids by the combination of dehydration and temperature. Air saturation, together with the final desired water content, as a practical matter, limits the lower limit of product temperature of about 65° C., although lower product temperatures may be satisfactory. The higher product temperatures are more conducive to continued enzyme control. Product temperatures about 68° C. result in the highest quality for baking and other use and best storage occurs with product temperatures of 73° C.

The water content of the final product is also important in determining the keeping qualities. The practical upper limit of moisture content in the finished product is about 10%. The lower practical limit is not known but final products of water content of 5% have very satisfactory handling and baking properties. Generally, the lower the water content, the greater the keeping time, and ground products of about 10% water content dehydrated with gases about 300° C. will keep for at least a year. If the water content is 5% or thereabouts, the flour will keep for years.

Tortilla flour of different degrees of fineness may be made by the invention. The centrifugal grader of impact mills and the amount of impaction of the mills needs merely to be adjusted to obtain any degree of coarseness for steeped grain.

While we have described our invention with reference to a specific process, we do not limit ourselves to this specific description nor otherwise, but we include all variations and modifications thereof as fall within the true spirit and scope of our invention.

We claim:

1. The method of producing a corn tortilla flour that keeps for long periods comprising: steeping corn kernels in aqueous calcium hydroxide solution of pH 11.5 to 14 and having a temperature of about 78° C. for about an hour; and then simultaneously comminuting the steeped corn to flour and dehydrating the steeped corn by hot gases not less than about 180° C. until the water content of the flour is not in excess of about 10%, the drying taking place such that the flour temperature is not above about 68° C. and the initial exposure of the whole corn kernels to the hot gases destroying bacteria and fungi and the process inactivating the enzymes that cause rancidity.

2. The method of producing a corn tortilla flour having a long shelf life comprising: steeping corn in aqueous alkaline solution of at least pH 11.5 and in the temperature range of 68° C. to 82° C. for two hours to one-half hour respectively; and then comminuting the steeped corn to a flour and simultaneously with the comminuting also dehydrating the steeped corn with hot gas not less than about 180° C. until the water content is not in excess of about 10%, the initial exposure of the hot gas to the steeped corn destroying bacteria and fungi and the process destroying the enzymes that cause rancidity.

3. The method of producing a ground corn flour comprising: steeping corn in a hot aqueous alkaline solution of at least pH 11.5 and in the temperature and time combination range of 68° C. to 82° C. for about two hours to one-half hour respectively; then comminuting the steeped corn to the desired fineness and simultaneously with comminuting also dehydrating the steeped corn by a hot gas of at least about 180° C. until the water content is about 10% maximum, the drying taking place such that the corn is never heated above approximately 73° C., the initial exposure of the steeped corn kernels to the hot gas destroying bacteria and fungi, and the process destroying the enzymes that produce rancidity.

4. The method of preparing finely ground corn tortilla flour from whole corn grains which comprises: steeping whole corn grains in an aqueous solution of calcium hydroxide having a degree of alkalinity of from pH 11.5 to 14, the steeping being carried out at a temperature in the range of about 68° C. to 82° C. and for a time period of about two to one-half hours; and then subjecting the steeped whole corn grains to the direct action of a continuously flowing stream of drying gas heated to an initial temperature of not less than 180° C. to dry the grains while simultaneously comminuting the whole corn grains to a finely ground flour, the drying being continued for a time period sufficient to reduce the moisture content of the flour to not more than 10% by weight and taking place such that the final temperature of the flour does not exceed about 73° C., the exposure of the whole corn to the stream of drying gas during comminuting, destroying bacteria and fungi.

5. The method of producing a corn tortilla flour from whole corn grains comprising: steeping whole corn grains in a hot aqueous calcium hydroxide solution having a degree of alkalinity of at least pH 11.5, and the solution being maintained at a temperature not in excess of about 90° C., the steeping being continued for a period of about one-half to two hours; and then comminuting the wet steeped whole corn grains to a flour while simultaneously drying the grains by a stream of gas heated to a temperature of not less than 180° C., the simultaneous comminuting and drying of the grains taking place such that the temperature of the flour does not exceed about 73° C., and being continued until the moisture content of the flour is reduced to not more than 10% by weight.

References Cited in the file of this patent

UNITED STATES PATENTS

| | | |
|---|---|---|
| 826,983 | Phippen | July 11, 1906 |
| 987,560 | Erosa | Mar. 21, 1911 |
| 1,061,933 | Willford | May 13, 1913 |
| 1,268,860 | Lopez | June 11, 1918 |
| 1,334,366 | Garza | Mar. 23, 1920 |
| 1,423,830 | Christensen | July 25, 1922 |
| 1,662,401 | Sasseen | Mar. 13, 1928 |
| 2,152,367 | Smith | Mar. 28, 1939 |
| 2,509,418 | Brown | May 30, 1950 |
| 2,535,570 | Gordon | Dec. 26, 1950 |
| 2,584,893 | Lloyd | Feb. 5, 1952 |
| 2,585,978 | Van Atta | Feb. 19, 1952 |